(12) United States Patent
Britte et al.

(10) Patent No.: US 9,841,278 B2
(45) Date of Patent: Dec. 12, 2017

(54) SYSTEM AND METHOD FOR RESOLVING INFORMATION ABOUT A ROTOR COMPRISING A MEASURING DEVICE FOR MEASURING AND RECORDING IN A FIXED ROTOR STATE WITHOUT VIBRATION DUE TO ROTATION

(71) Applicants: Laurent Britte, Hannut (BE); Karl Janssens, Linden (BE); Antonio Palermo, Leuven (BE)

(72) Inventors: Laurent Britte, Hannut (BE); Karl Janssens, Linden (BE); Antonio Palermo, Leuven (BE)

(73) Assignee: Siemens Industry Software NV, Leuven (BE)

( * ) Notice: Subject to any disclaimer, the term of this patent is extended or adjusted under 35 U.S.C. 154(b) by 55 days.

(21) Appl. No.: 14/870,138

(22) Filed: Sep. 30, 2015

(65) Prior Publication Data

US 2017/0089693 A1    Mar. 30, 2017

(51) Int. Cl.
| | | |
|---|---|---|
| *G01D 5/347* | (2006.01) | |
| *G01B 11/26* | (2006.01) | |
| *G01B 7/30* | (2006.01) | |
| *G01D 5/14* | (2006.01) | |
| *G01D 5/244* | (2006.01) | |

(52) U.S. Cl.
CPC ............... *G01B 11/26* (2013.01); *G01B 7/30* (2013.01); *G01D 5/145* (2013.01); *G01D 5/2449* (2013.01); *G01D 5/24452* (2013.01); *G01D 5/24485* (2013.01)

(58) Field of Classification Search
CPC ........ G01B 11/26; G01B 7/30; G01B 11/275; G01D 5/2497; G01D 5/347; G01D 5/3479; G01D 5/2451; G01D 5/2458; H03M 2201/4125

USPC ........................................ 250/231.13, 559.26
See application file for complete search history.

(56) References Cited

U.S. PATENT DOCUMENTS

| | | | | |
|---|---|---|---|---|
| 6,459,389 B1 * | 10/2002 | Germuth-Loffler | .... | B62D 15/02 250/231.18 |
| 7,797,981 B2 * | 9/2010 | Vasiloiu | ............. | G01D 5/24452 73/1.79 |
| 8,829,895 B2 * | 9/2014 | Nitz | ....................... | B25J 9/1692 324/207.2 |

(Continued)

FOREIGN PATENT DOCUMENTS

| | | |
|---|---|---|
| EP | 1923670 A1 | 5/2008 |
| EP | 2259033 A2 | 12/2010 |

OTHER PUBLICATIONS

European Search Report for related European Application No. 16187640.4 dated Jan. 25, 2017.

*Primary Examiner* — Que T Le
(74) *Attorney, Agent, or Firm* — Lempia Summerfield Katz LLC

(57) ABSTRACT

A system and method for resolving the angular position of a rotor evaluates the real size of the stripes or gears on the rotor by an auxiliary device, such as a sensor shift device in a first embodiment or a camera in a second embodiment, at a fixed rotor, thus eliminating systematic errors and influence of rotor vibration during this calibration. By knowing the actual size or angular increment or produced sensor signal of each repeating element, a compensation of the error can be made and accuracy can be dramatically increased.

14 Claims, 5 Drawing Sheets

(56) References Cited

U.S. PATENT DOCUMENTS

| | | |
|---|---|---|
| 2008/0148808 A1 | 6/2008 | Vasiloiu |
| 2010/0312504 A1 | 12/2010 | Rossi et al. |
| 2011/0282612 A1 | 11/2011 | Cramer |
| 2012/0262156 A1 | 10/2012 | Nitz et al. |

* cited by examiner

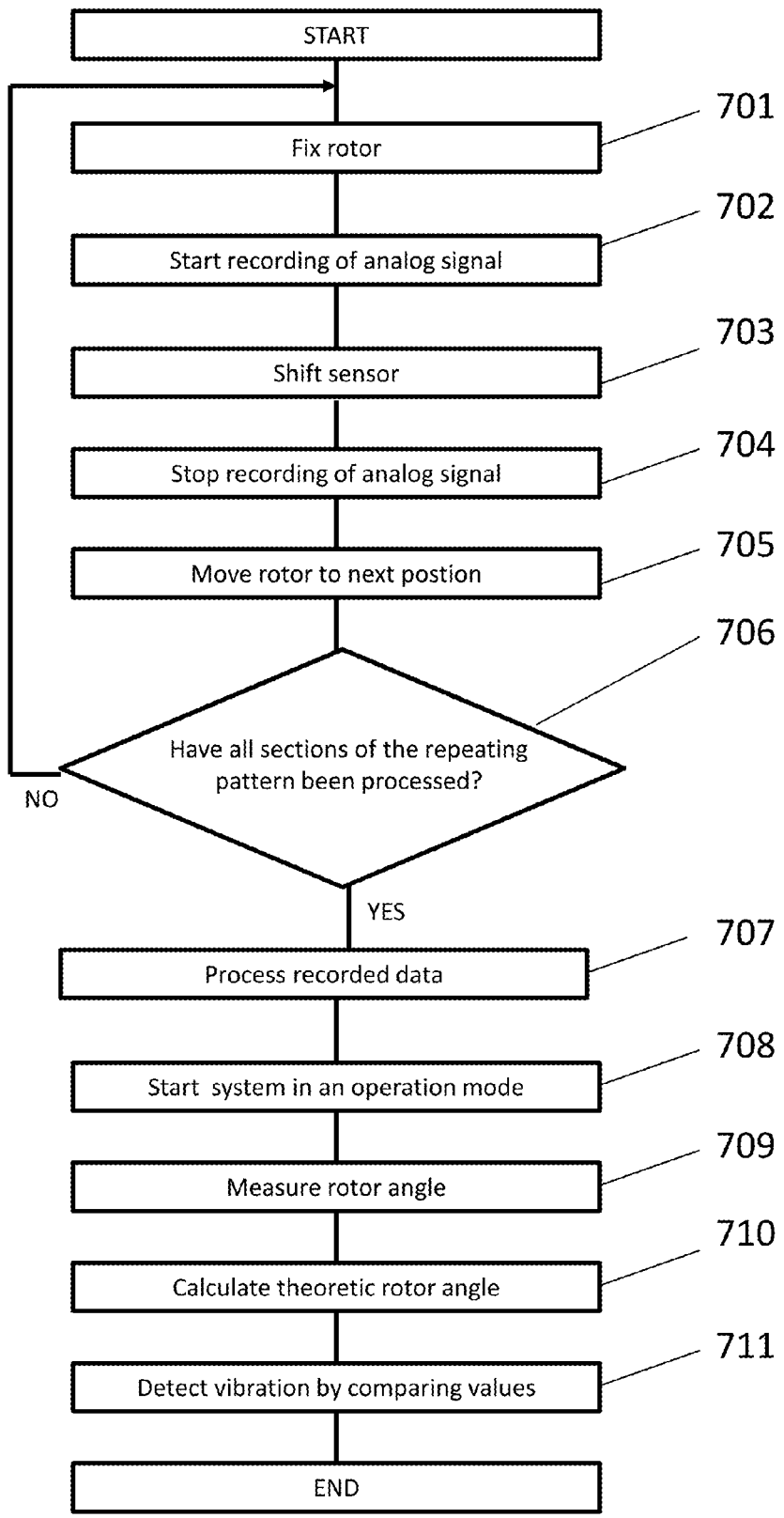

SYSTEM AND METHOD FOR RESOLVING INFORMATION ABOUT A ROTOR COMPRISING A MEASURING DEVICE FOR MEASURING AND RECORDING IN A FIXED ROTOR STATE WITHOUT VIBRATION DUE TO ROTATION

TECHNICAL FIELD

The present disclosure is directed, in general, to computer aided monitoring, control, and simulation of mechanical systems, in particular torsional vibration monitoring of rotors.

BACKGROUND

For testing and operating of mechanical systems, in particular for rotor vibration measurement, there is a demand for low-cost and minimally intrusive instrumentation.

Traditionally, phonic wheels, gears/gear rims, light and dark stripes or other specifically designed periodic structures are placed on rotors where the vibration measurement has to be made. The passage of each individual structure is detected by a sensor. The rotor moves with respect to the sensor. Limitations on the accuracy of the stripe size directly translate in a severe limitation to measurement accuracy. In fact, only in theory are stripes or blocks of a rotor marking or of a gear rim uniformly spaced.

Rotor vibration measurements are mainly related to torsional vibrations (vibrations around the axis of rotation), however rotor vibration may easily exhibit torsional-lateral coupling. Therefore, the general term "rotor vibration" is used here. Typical measurement campaigns on rotating machinery include an angular reference for phase synchronization between vibrations and angular position. Such synchronization does not pose particular difficulties, however it also brings limited insights on the rotor performance. Detailed vibration measurements, such as rotor instantaneous angular speed, twist angle, torque, stiffness and motion transmission error, require, however, high measurement accuracy. With better accuracy, the evaluations on performance attributes (e.g. consider early fault detection to evaluate machine health)are finer and more sensitive.

For example, to achieve the required accuracy, optical encoders or laser vibrometers are needed. An encoder requires an accessible shaft or substantial space to be mounted on a rotor; both of them are typically not available since packaging space is kept to a minimum. Furthermore, encoders are not available with custom diameter sizes and a redesign is typically required to make mounting possible. Such obstacles often cannot be overcome; therefore, valuable detailed measurements cannot be performed using encoders. Laser vibrometers can perform a contactless measurement and bring an improvement on ease of instrumentation. However, this comes at the price of a reduced accuracy and a substantially increased cost (especially important when multiple locations need to be measured simultaneously). Furthermore, the scanning head of a laser vibrometer has a considerable size. Moreover, a few requirements for beam positioning introduce significant constraints on reachable locations. Again such limitations often do not allow performing the detailed measurements.

A further technique can be mentioned for such measurement. It uses paired accelerometers tangentially mounted on the circumference of the rotor. Accelerations are subtracted to separate lateral and torsional vibration. The bandwidth of the measurement is in fact very high and sensitivity and accuracy improve with frequency. This technique in some cases may be used, although it requires extremely tight tolerances for relative positioning and systems to acquire signals from rotating sensors.

On the other hand, measurement techniques reducing cost, time, and instrumentation complexity are available. Examples are represented by black/white striped tapes (so called "zebra tapes") or electromagnetic sensors pointed at phonic wheels, gears/gear rims or bladed rotors. Periods on the rotor (namely the passing stripes, teeth, or blades) are detected and are used to generate a square wave signal, for example a TTL voltage variation. Each wave period is then associated to an angular increment or angular period. As mentioned before, limitations on the accuracy of the stripe size directly translate in a severe limitation to measurement accuracy; the same applies to the accuracy of teeth on rims/gear rims or period of rotor blades or the like. Only in theory are stripes or blocks of a gear rim uniformly spaced.

The measurement error for zebra tapes currently is about one order of magnitude higher than for laser vibrometers and two orders of magnitude higher than the error for optical encoders.

BRIEF SUMMARY

Variously disclosed embodiments include precise and minimal intrusive systems and methods for evaluating machine condition, in particular rotor position or torsional rotor vibration.

Embodiments include methodologies to evaluate the real size of each of the stripes or gears on the rotor by an auxiliary device, such as a sensor shift device in a first embodiment or a camera in a second embodiment, at a fixed rotor, thus eliminating systematic errors and influence of rotor vibration during this calibration. By knowing the actual size or angular increment or produced sensor signal of each repeating element, a compensation of the error can be made, and accuracy can be substantially increased.

Accordingly, the present solution represents an enabling technology to increase both bandwidth and resolution, using low-cost and non-intrusive instrumentation, with extremely limited additional cost and instrumentation effort. Disclosed embodiments have numerous advantages, including but not limited to, reaching, at a fraction of the cost, time and intrusiveness, an accuracy which is better than a laser vibrometer and at least comparable to high-quality optical encoders. Applicability of the methodology is widespread to the vast majority of rotating machinery, where due to past limitations and complexity, detailed rotor measurements with high accuracy were not possible.

The mentioned repeatability of the error means that an effective compensation can be made by subtracting this error from the measured angular position. This compensation can be considered as a calibration based on a measured individual stripe size, which is not as uniform as it should be in theory.

In one exemplary embodiment, a system for resolving the angular position of a rotor is provided. The system includes a rotor having a circumference, the circumference having a repeating pattern thereon, wherein the repeating pattern has multiple repeating segments; a contactless sensor directed to the pattern during rotation of the rotor; a measuring device adapted for measuring and recording, in a fixed rotor state, one of: an angular period of every segment of the repeating pattern; or a width of every segment of the repeating pattern; or an output signal of the contactless sensor signal by moving along every segment of the repeating pattern.

In another exemplary embodiment, a method for resolving the angular position of a rotor is provided. The method includes: evaluating, in a calibration mode, an error value for every segment of the repeating pattern, the compensation value representing the difference between the real angular position and the output signal of the contactless sensor; correcting, in an operational mode, the signal output of the contactless sensor by applying the error values; and outputting the corrected signal as the angular position.

In a further exemplary embodiment, a method for detection of vibration of a rotor is provided. The method includes:
   evaluating, in a calibration mode, an error value for every segment of the repeating pattern, the compensation value representing the difference between the real angular position and the output signal of the contactless sensor;
   correcting, in an operational mode, the signal output of the contactless sensor by applying the error values;
   outputting the corrected signal as the angular position;
   calculating, based on an average rotation speed of the rotor, a theoretic angular position of the rotor,
   calculating, for multiple positions of the rotor, the difference value between said theoretic position and the real angular position; and
   calculating, from that difference value, vibration of the rotor.

In another exemplary embodiment, a method for measuring the systematic error in a calibration mode is provided. The method includes:
   1. rotating the rotor to a set of angular positions;
   2. For each angular position, capturing, using an auxiliary optical device (for example, a camera), images of the repeating pattern (e.g., zebra tape or rotor engraving); and
   3. post-processing the image (for example, using digital image processing) to calculate the actual size of each stripe.

In another exemplary embodiment, a method for measuring the systematic error in a calibration mode is provided. The method includes:
   1. rotating the rotor to a set of angular positions;
   2. For each angular position, shifting a sensor (for example, an optical or magnetical probe) for recording a sensor signal section for a section of repeating pattern (e.g. zebra tape, metal structure); and
   3. post-processing the recorded segments to calculate, for each of the repeating patterns, the systematic error.

The calibration procedure needs to be done only once for one rotation, since the error is repeatable. In another exemplary embodiment, a method to perform the calibration without the need of an accurate reference is provided. The method includes: evaluating the real size of the stripes on the rotor an auxiliary optical device, such as a camera, or by a shifting device for the same sensor that is used in an operational mode.

After the compensation is made, the systematic error is removed; therefore, the residual error is random and can be attenuated even further by synchronous averaging. Averaging would have not been effective in case of the original error, dominated by the repeatable component.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that the conception and the specific embodiments disclosed may be used as a basis for modifying or designing other structures for carrying out the same purposes of the present disclosure. Those skilled in the art will also realize that such equivalent constructions do not depart from the spirit and scope of the disclosure in its broadest form.

Before undertaking the Detailed Description below, it may be advantageous to set forth definitions of certain words or phrases that may be used throughout this patent document. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

BRIEF DESCRIPTION OF THE DRAWINGS

The components and the figures are not necessarily to scale, emphasis instead being placed upon illustrating the principles of the disclosure. Moreover, in the figures, like reference numerals designate corresponding parts throughout the different views.

FIG. 7 illustrates an embodiment of a method for detection of vibration of a rotor.

DETAILED DESCRIPTION

Figure 1:
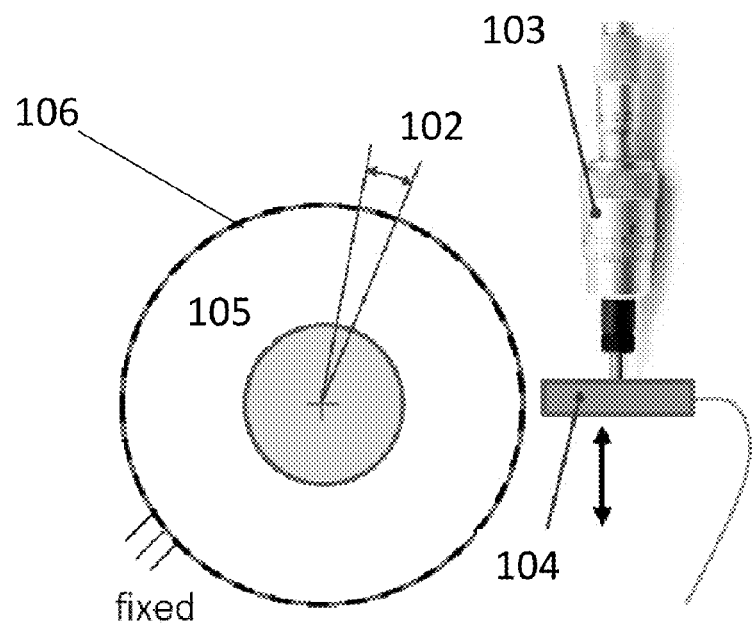
FIG. 1 illustrates one embodiment of the system with an actuator for shifting a sensor, the sensor being directed to a repeat block pattern on a rotor.

FIG. 1 illustrates one embodiment of the system with an actuator 103 for shifting a sensor 104, the sensor 104 being directed to a repeating block pattern 106 on a rotor 105. In this example, one repeating element includes one black and one white bar covering one angular period 102 of the rotor 105. While the exemplary embodiments utilize black and white bars, other repeating patterns, shapes, colors, and the like may be used as well.

In this example, the contactless sensor used in operational mode is also used as the measuring device. For obtaining a signal while the rotor is fixed, the contactless sensor is mounted to a shifting device, the shifting device being arranged for shifting the contactless sensor tangential or concentric to the rotor. The shifting distance or shifting angle covers at least one segment of the repeating pattern.

The repeating pattern can be formed by a metal structure, in particular a gear rim. For this embodiment, the contactless sensor can be an electromagnetic sensor. Of course, other structures can be used, such as blades on a turbine shaft or other repeating elements that may be part of the rotor anyway. It is also possible to use an adhesive magnetic tape that is magnetized with a repeating pattern.

In another embodiment, the repeating pattern is formed by an optical pattern; this example will be discussed later in connection with FIG. 5. This pattern might include a stripe-printed tape applied to the rotor, a so-called "zebra tape". In this case, the contactless sensor is an optical sensor and the measuring device may include a camera device for recording photographic pictures of the segments. The optical pattern can also be engraved directly to the rotor, e.g. using a laser system.

As opposed to digital signals, it is known that more information can be extracted from the raw signal acquired in analog mode. Exploiting the shape of the signal, fractions of periods could be measured. Such information is nowadays not practically accessible, because the shape of the analog signal is not easy to predict and depends on several variables that cannot be practically measured. It follows that, only increments equal to full periods on the rotor can nowadays be measured.

Figure 2:
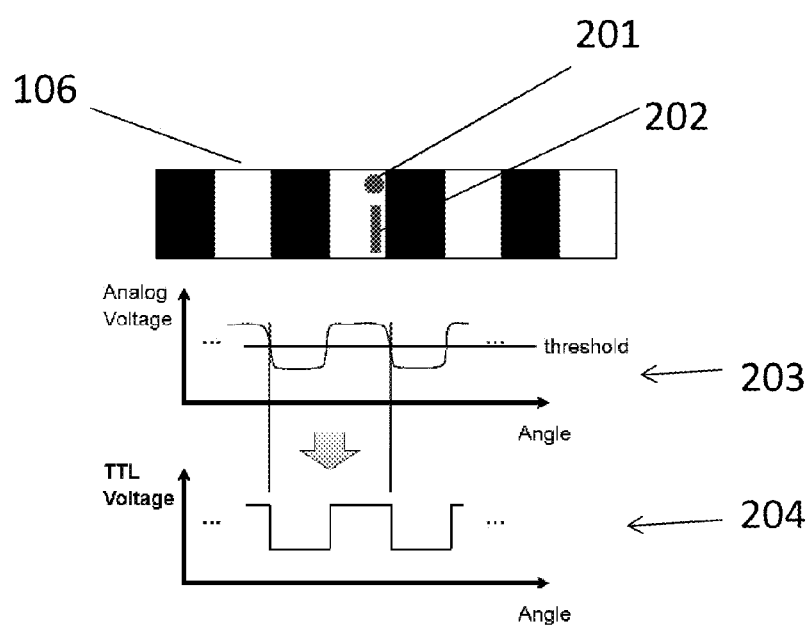
FIG. 2 illustrates sensing a block pattern with a sensor with a small aperture and the resulting sensor voltage and derived TTL (Transistor-to-Transistor Logic) signal.
Figure 3:
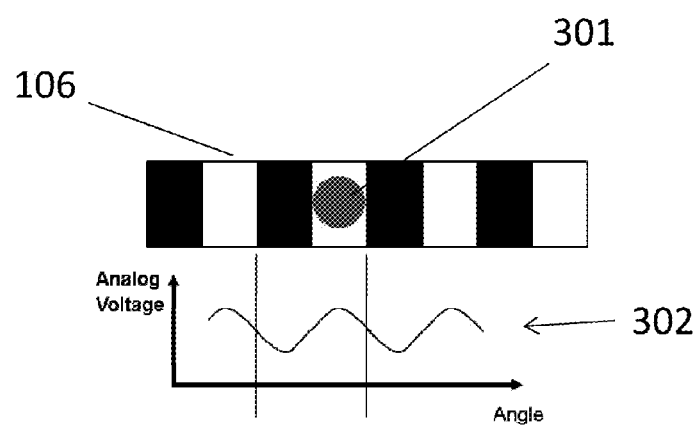
FIG. 3 illustrates an embodiment of the sensor with a bigger aperture and resulting sensor voltage.

A comparison of FIGS. 2 and 3 can demonstrate the advantages of the analog approach that exploits the signal waveform. A similar logic can be used both for optical and electromagnetic technologies (in the latter case with a dependence on speed); therefore the conclusion reached at the end of the following examples is general.

FIG. 2 shows some angular periods of the pattern 106 known from FIG. 1. For zebra tape measurements, it is normally suggested that the detection spot 201 or detection footprint 202 (sensor aperture) of the optical probe or sensor 104 are much smaller than the width of a stripe. Therefore, the passage across light and dark stripes generates a sharp change in the analog signal 203, which is better suited to generate a square wave signal 204 in combination with a threshold. If using a TTL signal without the exploitation of the analog signal, such small sensor apertures are good because the monitoring of the threshold is not critical because of sharp edges of the analog signal.

As shown in FIG. 3, the probe is selected using the opposite criterion: the detection spot 301 size for the optical probe is comparable to the width of a stripe. In this way a continuous waveform 302 can be generated.

Figure 4:
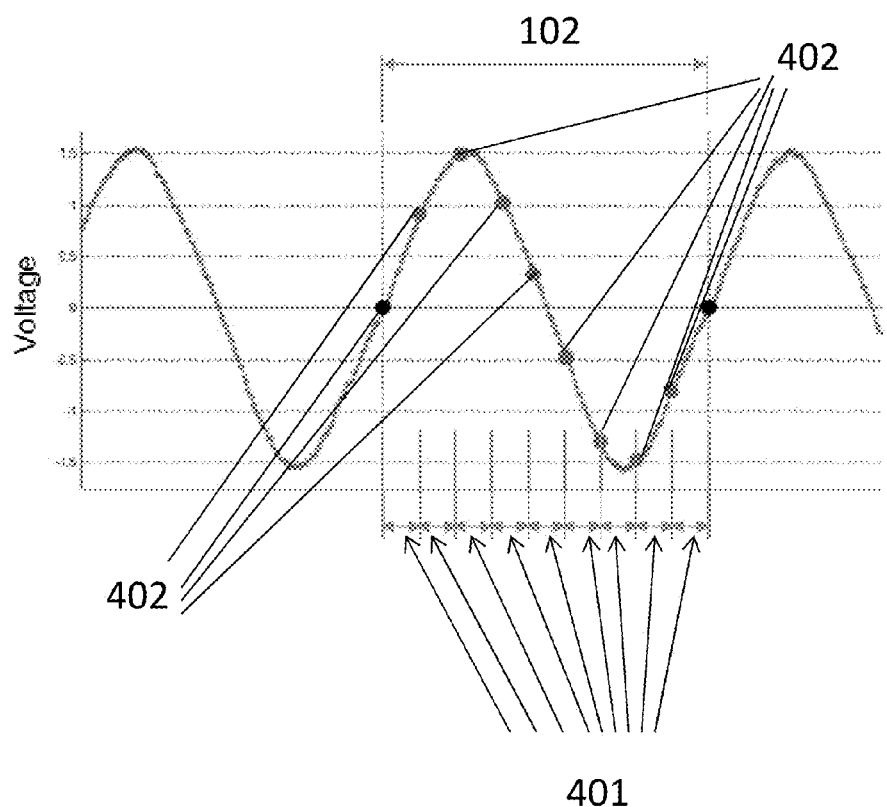
FIG. 4 illustrates evaluation of the signal known from FIG. 3, leading to resolution of fractions of an angular period.

FIG. 4 shows an example of real measurement following these considerations as outlined in connection with FIG. 3. The waveform 302 can be sampled to detect increments that are fractions 401 of an angular period 102. In this way, both bandwidth and resolution can be increased. The samples 402 are illustrated as bold points in FIG. 4. In the example, 9 additional samples 402 in one waveform period 102 are added, leading to a resolution that is 10 times finer and to a bandwidth that is 10 times broader. In order to exploit the additional samples 402 on the waveform, a relationship between the analog signal and the angle needs to be known. Such relationship is difficult to calculate because of several unknown variables that are dependent on each specific instrumentation and installation (e.g. materials properties, distance between sensor and rotor, environmental parameters, etc.). The present system and method provides a solution to the problem, introducing a practical approach to directly measure this analog signal-to-angle relationship.

The optical sensor might be supported by an ambient light probe because the sensor signal might be biased or influenced by ambient light. A signal of the ambient light probe can be used for correction of the original sensor signal.

Figure 5:
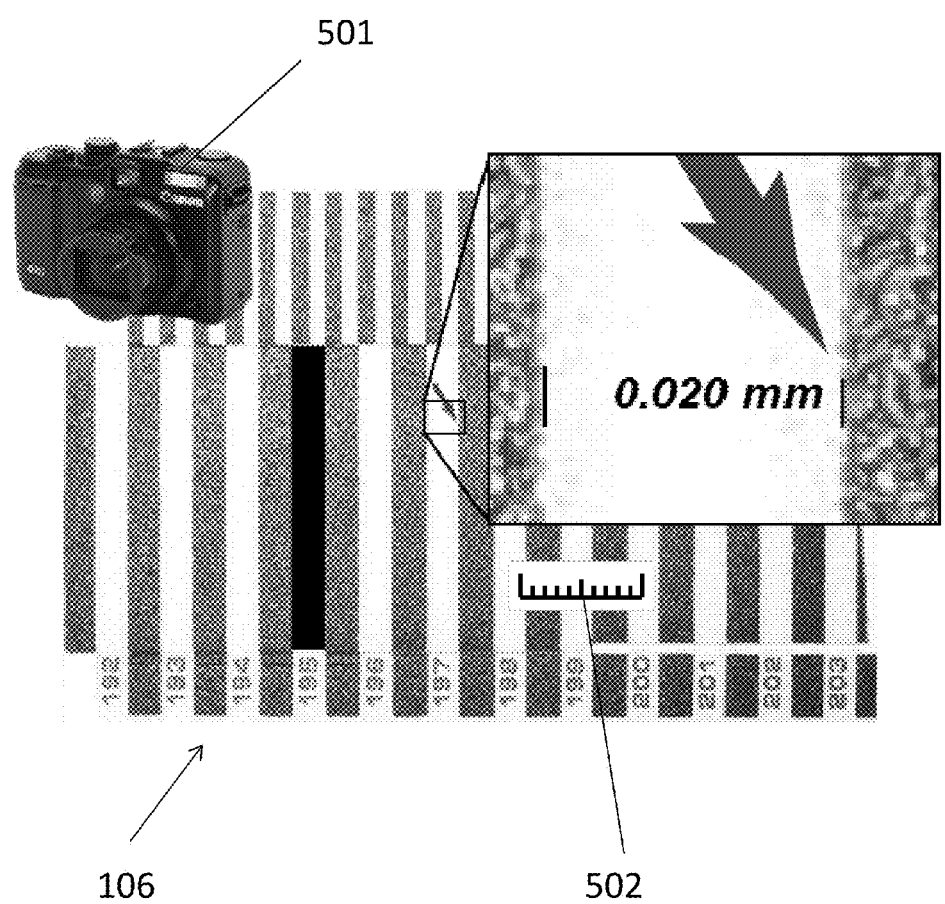
FIG. 5 illustrates one embodiment of a system with camera-based evaluation of the blocks of a repeating pattern.

FIG. 5 illustrates a system with camera-based evaluation of the blocks of a repeating pattern 106. A camera 501 is used for taking multiple pictures of the pattern 106, each picture recording a limited number of angular periods of pattern elements. The rectangular enlarged detail illustrates that the limits of the black bars are not as sharp as they should be in theory. Moreover, the width of the bars can vary over the circumference of a rotor, e.g. due to improper printing or elongation of the tape that can occur during applying to the rotor or due to shrinking of the plastic foil. The pictures can be evaluated automatically by automatic image processing, or manually. In an embodiment, a ruler 502 can be placed in the viewing area of the camera for calibration of reproduction scale from one or multiple images.

Figure 6:
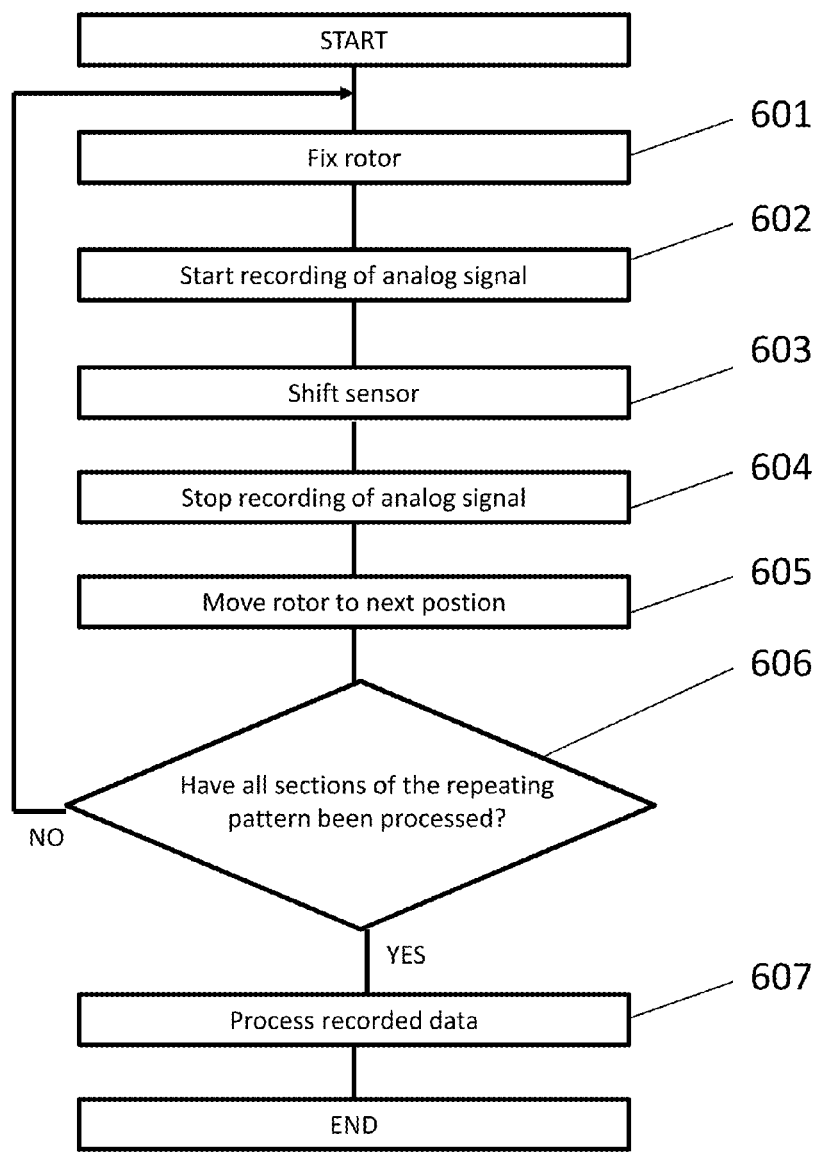
FIG. 6 illustrates one embodiment of a method for resolving the angular position of a rotor.

FIG. 6 illustrates a method for resolving the angular position of a rotor in the system shown in FIG. 1. The methodology involves the following acts which are to be repeated until all angular periods are measured:

601: the rotor is resting in an angular position;
  602: the recording of the analog signal is started;
  603: the actuator is activated to make the sensor travel an imposed distance that covers at least one angular period on the rotor;
  604: the recording is stopped;
  605: the rotor is moved to next segment or repeating element;
  606: repeat until all segments have been processed;
  607: the recorded data is processed, wherein the relation between sensor signal and rotor angle is calculated.

By this, for each angular period 102, a signal 302 can be recorded and sampled as described in connection with FIG. 4. After completion, the recorded signal can be used for calibration.

Angular errors, which occur due to the curved surface of the rotor, increase with the size of a section, which is evaluated in one calibration step. Therefore, it is preferred to measure the angular period or width of a first subset of the segments of the pattern during a first cycle with fixed rotor. This first subset should cover a small rotor angle, in particular one or few angular period of the repeating pattern only. After measuring, turning the rotor to a next subset of the segments and again fixing the rotor position and recording of data is continued, until all segments have been processed. For detecting if all segments have been processed, the rotor may be equipped with an additional sensor-readable index marking. In this case, start and stop of the procedure might be triggered by detecting this index marking.

During or after completion of recording of all repeating elements, the recorded information is processed, wherein a relationship between the angle on the rotor and the displacement of the sensor is known from kinematic considerations. Based on the information available from acts 602-606, a precise relationship between the analog signal and the angle is calculated in the final act 607. In an operational mode, the information calculated in act 607 is used for resolving angular position of the rotor.

The acts 602-604 can be replaced by using a camera as shown in FIG. 5 for taking pictures of every repeating element of the pattern 106. In that case, the angular period of every element is retrieved by digital image processing or by manual evaluation of each picture.

FIG. 7 illustrates a method for detection of vibration of a rotor. Acts 701-707 refer to the calibration cycle and are identical to acts 601-607 of FIG. 6. Accordingly, discussion of these acts is not repeated here. The method for detection of vibration, in particular of torsional vibration, further comprises the following acts:

708: The rotor is accelerated to a desired working point, e.g. to a speed, torque, acceleration status in which vibration should be investigated;

709: Rotor position (angle) or phase is measured. By this the sensor signal is corrected or evaluated by the information gathered in calibration mode;

710: A nominal value of rotor position or rotor phase is calculated;

711: A comparison of measured and calculated rotor position or phase is calculated. The difference of both values is considered as a rate of vibration.

The disclosed embodiments accurately measure, with very limited effort, a curve that relates the analog signal values and the angular position (FIG. 4), thus allowing for measuring of fractions of a period on the rotor. In one embodiment, the procedure includes displacing the sensor with respect to the rotor of an accurately known quantity using an actuator ("sensor shifting device"), while normally it is the rotor which moves with respect to the sensor.

Rotor vibration measurements are performed across the whole (electro-)mechanical industry spectrum; examples include, but are not limited to, rotating machinery in industrial applications (electric drives, pumps, turbines, compressors), power plants (turbines, generators), wind energy generation (rotor, gearbox, generator), marine propulsion (propellers, dampers), vehicles (internal combustion engines, electric motors, transmissions, full drivelines), helicopters (engines, main transmission, tail rotor), and jet engines. It is common to all the applications that shafts and couplings are important components to be measured.

Current measurement campaigns on rotating machinery always include an angular reference for synchronization between vibrations and angular position. It would be valuable to perform detailed measurements so as to have closer insights on durability, efficiency, comfort, and machine health status. Detailed measurements typically have strict requirements in terms of resolution and bandwidth that require dedicated instrumentation. Two major examples in this direction are provided hereafter. The first example is related to small rotors: the number of angular periods is limited by a small circumference. Increasing the number of samples per period enables, therefore, increasing resolution and bandwidth. The second example is related to measuring directly on periodic rotors, like gears, sprockets, and bladed disks. Rotor vibrations have the same periodicity as the measured analog signal, which means that the traditional techniques are intrinsically corrupted by aliasing. In this case, increasing the number of samples per period represents the key to make the measurement possible. In both cases, if the procedure is iterated for all the periods of the rotor, the related spacing error can be measured and compensation can be applied in order to considerably increase the measurement accuracy.

A solution to these problems has been long sought by customers, especially for the case of torsional vibration, where detailed rotor vibration measurements cannot usually be included in test campaigns due to installation difficulties, time needed for instrumentation, and costs. Disclosed embodiments enable a considerably higher resolution and bandwidth for rotor vibration measurements using non-intrusive instrumentation. Comparing the value of the measurements and the time saved with respect to the low cost of the instrumentation, high profitability is expected when selling products that utilize the disclosed embodiments.

Quantitative gains on current times and costs can be estimated for encoders and laser vibrometers. These gains are well above a factor 10.

Disclosed embodiments can replace encoders. The design and manufacturing of a shaft extension or a custom mounting system for a rotor where an encoder needs to be mounted would require, in the most optimistic case, a timeframe in the order of weeks. Using zebra tapes solves the issue with one day of rotor instrumentation (for either gluing or engraving stripes) and one additional day for introducing the optical probe. The gain on time is well above a factor 10 for a single installation.

Disclosed embodiments can also replace laser vibrometers, resulting in significant cost savings While the exemplary embodiments have been described above in detail, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this disclosure in its broadest form.

None of the description in the present application should be read as implying that any particular element, step, act, or function is an essential element which must be included in the claim scope: the scope of patented subject matter is defined only by the allowed claims. Moreover, none of these claims are intended to invoke 35 USC §112(f) unless the exact words "means for" are followed by a participle.

We claim:

1. A system for resolving information about a rotor, the system comprising:
   a circumference of the rotor, the circumference having a repeating pattern thereon, wherein the repeating pattern has multiple repeating segments;
   a contactless sensor directed to the pattern during rotation of the rotor;
   a measuring device configured for measuring and recording, in a fixed rotor state without vibration due to rotation, one or more of:
      an angular period of every segment of the repeating pattern;
      a width of every segment of the repeating pattern; and
      an output signal of the contactless sensor signal by moving the sensor along every segment of the repeating pattern.

2. The system of claim 1, wherein a detection spot of the contactless sensor has a comparable size or diameter to the width of a single element of the repeating pattern.

3. The system of claim 1, wherein:
   the contactless sensor is the same as the measuring device;
   the contactless sensor is mounted to a shifting device, the shifting device being arranged for shifting the contactless sensor tangential or concentric to the rotor; and
   the shifting device has a shifting distance or shifting angle covering at least one segment of the repeating pattern.

4. The system of claim 3, wherein;
   the repeating pattern is formed by a gear rim; and
   the contactless sensor is an electromagnetic sensor.

5. The system of claim 1, wherein:
   the repeating pattern is formed by an optical pattern, and
   the contactless sensor is an optical sensor.

6. The system of claim 5, wherein the system further comprises an ambient light probe, a signal of the ambient light probe for correction of a signal of the optical sensor.

7. The system of claim 1, wherein the measuring device comprises a camera device for recording photographic pictures of the segments.

8. The system of claim 6, wherein the system further comprises a ruler within the viewing area of the camera device.

9. The system of claim 1, wherein the repeating pattern is formed by a stripe-printed tape applied to the rotor.

10. The system of claim 1, wherein the repeating pattern is formed by a laser engraved pattern on the surface of the rotor.

11. The system of claim 1, wherein the repeating pattern is formed by blades of a turbine rotor.

12. The system of claim 1, wherein the rotor is marked with an additional sensor-readable index marking.

13. The system of claim 1, wherein the repeating pattern repeats around the entire circumference without a gap.

14. The system of claim 1, wherein a correction for a signal from the contactless sensor during rotation of the rotor is a function of a signal from the measuring device.

* * * * *